United States Patent Office 3,732,122
Patented May 8, 1973

3,732,122
PRESSURE-SENSITIVE ADHESIVE TAPE
Vagn Christian Albert Fehrn-Christensen, Fridbach 2, Zug, Switzerland
Filed Jan. 25, 1971, Ser. No. 109,542
Claims priority, application Great Britain, Feb. 3, 1970, 5,219/70
Int. Cl. C09j 7/02
U.S. Cl. 117—122 PF                 3 Claims

ABSTRACT OF THE DISCLOSURE

In the manufacture of pressure-sensitive adhesive tape a carrier tape consisting of a plastic material is normally used, such carrier tape being covered at least one side with a suitable adhesive layer. The carrier tape is normally made of a sheet with a thickness of 0.04 mm. with a tensile breaking strength of from 12 to 15 kp. at a width of 25 mm. measured at a draw rate of 300 mm. per minute. The purpose of the present invention is to provide a pressure-sensitive adhesive tape having a tensile breaking strength in the longitudinal direction of at least 40 kp./25 mm. width at 0.05 mm. thickness and a transverse elongation of at least 20% are obtained, both measurements made at a draw rate of 300 mm./min. In accordance with the invention this is obtained by using a carrier tape which is produced from a strip of polyolefinic sheet by subjecting the strip to a longitudinal stretching under such conditions that the transverse dimension of the strip is substantially unaffected by the stretching.

---

Figure 1:
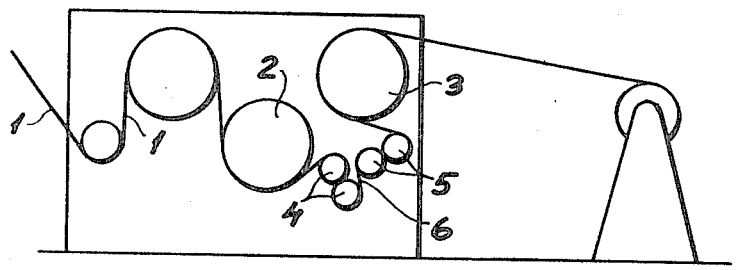

In the manufacture of pressure-sensitive adhesive tape a carrier tape consisting of a plastic material is normally used, such carrier tape being covered at least at one side with a suitable adhesive layer.

The requirements that must be fulfilled by the carrier tape material of a pressure-sensitive adhesive tape are normally a combination of a suitable high strength and great flexibility, besides which it must be resistant to external influences such as heat, cold, moisture, chemicals, etc.

A material freqeuntly used for the carrier tape is unplasticized polyvinylchloride (UPVC), which combines low cost with resistance to external influences and a reasonably high strength. The most commonly used sheet thickness is 0.04 mm. with a tensile breaking strength of from 12 to 15 kp. at a width of 25 mm. measured at a draw rate of 300 mm. per minute. The unit kp. represents a unit of force which is required to cause a 1 kg. mass to accelerate go (9.81 m./sec.²). One kg.=9.81 N (Newton) or 2.21 lb. force.

Adhesive tapes having a strength in this range are adequate for many purposes, but where a higher breaking strength is required it has been suggested to use a UPVC foil of greater thickness, for instance up to 0.1 mm., which would provide a tensile breaking strength of approximately 35 kp. at 25 mm. width. An adhesive tape made from an 0.1 mm. foil, however, would be substantially stiffer than a tape made from 0.04 mm. foil, and in practical use such a tape has been found to be so stiff that it is difficult to make it adhere to a surface, besides which it requires a thicker layer of adhesive than a thinner and more pliable tape.

It is in fact both expensive and inexpedient.

Another manner of providing stronger adhesive tapes without substantially impairing the pliability is to reinforce the plastic strip by longitudinal filaments of glass, polyamide or other synthetic material, by which it is possible to reach quite appreciable tensile breaking strengths, usually within the order of 100–200 kp./25 mm. width. But an adhesive tape like this is relatively expensive in production, and there has been found to be a considerable demand for pressure-sensitive adhesive tape having a breaking strength above that obtainable with the practically applicable sheet thicknesses of from 0.04 to 0.06 mm., but still somewhat below the breaking strength of at least 100 kp./25 mm. width obtained by the said rather expensive reinforcement with synthetic filaments.

It is the purpose of the present invention to provide a pressure-sensitive adhesive tape having a breaking strength within the above mentioned required range, and it has been found that this can be achieved according to the invention by using as carrier tape produced from a strip of a modified or non-modified polyolefinic sheet by subjecting the strip to a longitudinal stretching and transverse stretching simultaneously, under such conditions that the transverse dimension of the strip is substantially unaffected by the stretching. This means that during the stretching operation the width of the strip is retained substantially unchanged. This might preferably be done in such a manner that a tensile breaking strength in the longitudinal direction of at least 40 kp./25 mm. width and 0.05 mm. thickness and a transverse elongation of at least 20% are obtained, both measurements made at a draw rate of 300 mm./min.

Stretching in the longitudinal direction is known to cause a molecular orientation, and if carried out without a simultaneous transverse stretching it may lead to a complete breaking up of the strip into individual longitudinal fibres. But if the longitudinal stretching is accompanied by a simultaneous transverse stretch, certain crosslinkages will be produced between the fibres and the said breaking up of the strip into individual fibres is obviated. A suitable adjustment of the stretching process so that the width of the strip is substantially unchanged will result in an adequate increase of the strength in the direction of stretch, while at the same time the transverse elongation will be sufficient for the material to be applicable as carrier for an adhesive to form a pressure-sensitive adhesive tape having a strength within the said intermediate range. In the transverse direction the strip in fact need not have any particularly great strength; it shall only be strong enough to ensure that no breaking up occurs, which would make the adhesive tape entirely useless.

It will be appreciated that by the manufacture of a pressure-sensitive adhesive tape in the manner described above a novel product possessing specifically advantageous properties is obtained. The result is a tape of a strength within the desired intermediate range, and it has been accomplished by means of quite cheap materials which nevertheless have the desirable pliability. By way of example it may be mentioned that a tape as described above can be produced by means of a carrier base of polypropylene, polyethylene, or copolymers thereof or of material containing one of these substances as chief component admixed for instance with minor amounts of pigments, plasticizers, stabilizers, etc., which do not materially change the physical properties.

As a further advantage beyond the high breaking strength of the pressure-sensitive adhesive tape made according to the invention it may be mentioned that the cost of the sheet material will be lower per unit of volume than that of the base material normally used for adhesive tape, since a relatively thin sheet, for instance 0.05 mm., of a polyolefin, for instance a copolymer, can give a breaking strength of at least 40 kp./25 mm. width, and this material has a specific gravity about 0.9 and the price per unit of weight is approximately the same as that of a UPVC having a specific gravity of about 1.4.

Moreover it should be mentioned that the said polyolefins are substantially more heat resistant than UPVC, so that it is possible, when aplying the adhesive layer to the strip, to use a considerably higher drying temperature, and it will be obvious that by drying for instance at 120° C. instead of 80° C. very appreciable increase of the production rate and thereby a reduction of production costs are achieved.

Figure 2:
Figure 3:
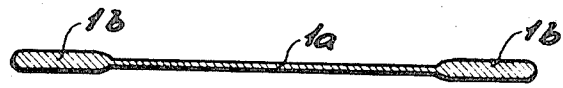
Figure 4:
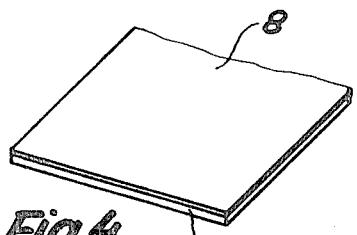
Figure 5:
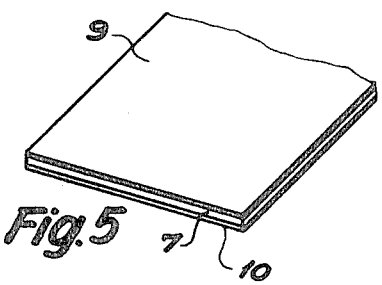

By way of example a preferred method of stretching used for achieving the carrier tape shall be further explained in relation to the drawing where FIG. 1 is showing diagrammatically an apparatus adapted for such a process, FIGS. 2 and 3 are showing a cross-section of a strip before and after the stretching, and FIGS. 4 and 5 are showing each a piece of a pressure-sensitive adhesive tape in accordance with two different embodiments of the invention.

FIG. 1 shows an apparatus with a number of rollers for guiding a continuous strip 1 of polyolefinic sheet material. Two rollers 2 and 3 are heating rollers and between those two rollers the strip 1 is passing two pairs of rollers 4 and 5, each of which pair of rollers is clamping the strip firmly. The rollers 5 are rotated at a speed higher than the speed at which the rollers 4 are rotated so that the strip 1 is stretched considerably during the short passage from the pair of rollers 4 to the pair of rollers 5. The stretching takes place at a temperature determined by the heating roller 2 and through the heating created by the heating roller 3 a stabilizing effect is obtained for the stretched strip 1a.

In FIG. 2 the cross-section of the unstretched strip 1 is shown and in FIG. 3 the stretched strip 1a is shown in cross-section. From FIG. 3 it will be observed that the thickness of the strip 1a is considerably reduced compared with the thickness of the original strip 1 except for narrow edge portion 1b, whereby the total width of the strip 1a has been substantially retained, thereby creating a longitudinal tensile strength and transverse elongation properties within the range defined above.

After the stretching the strip 1a may be cut into narrow carrier tape 7 in any suitable manner and may be covered with an adhesive layer 8 as shown in FIG. 4, or the carrier tape 7 may be covered with adhesive layers 9 and 10 on each side thereof such as shown in FIG. 5.

Other known methods of stretching the strip may be used as the invention is not limited to the described methods but is only dealing with the use of a carrier tape cut from a strip which by any suitable longitudinal stretching under substantially retaining of transverse dimensions of the strip has obtained the desired mechanical properties.

What I claim is:

1. A pressure-sensitive adhesive tape consisting of
  a carrier tape having a thickness of from 0.04 to 0.06 mm. and
  covered at least on one side with an adhesive layer,
  said carrier tape being a strip of polyolefinic sheet having a tensile breaking strength in the longitudinal derection of at least 40 kp. for a tape of 25 mm. width and 0.05 mm. thickness and a transverse elongation of 20% or slightly more, both measurements being made at a draw rate of 300 mm./min.

2. A pressure-sensitive adhesive tape as defined in claim 1 and wherein the carrier tape is produced from a material consisting wholly or chiefly of polypropylene, polyethylene or copolymers thereof.

3. A pressure-sensitive adhesive tape as defined in claim 2 and wherein the material of the carrier tape contains pigments, plasticizers, stabilizers or other additives in such minor amounts that thereby the physical properties of the material are not materially changed.

References Cited

UNITED STATES PATENTS

| 3,088,848 | 5/1963 | Tritsch | 117—122 |
| 3,214,503 | 10/1965 | Markwood | 264—210 |
| 3,079,278 | 2/1963 | Naudain | 117—122 |
| 3,503,842 | 3/1970 | Kahn | 117—138.8 X |

WILLIAM D. MARTIN, Primary Examiner

T. G. DAVIS, Assistant Examiner

U.S. Cl. X.R.

117—4, 7, 68.5, 122 P, 138.8 E